(12) United States Patent
Powell

(10) Patent No.: US 8,684,456 B2
(45) Date of Patent: Apr. 1, 2014

(54) CHILD SAFETY SEAT FOR VEHICLE

(75) Inventor: Iain Powell, Andover (GB)

(73) Assignee: Britax Romer Kindersicherheit GmbH, Ulm (DE)

( * ) Notice: Subject to any disclaimer, the term of this patent is extended or adjusted under 35 U.S.C. 154(b) by 0 days.

(21) Appl. No.: 13/607,172

(22) Filed: Sep. 7, 2012

(65) Prior Publication Data

US 2013/0062917 A1    Mar. 14, 2013

(30) Foreign Application Priority Data

Sep. 13, 2011 (EP) .................................. 11007467

(51) Int. Cl.
*B60N 2/42*        (2006.01)
(52) U.S. Cl.
USPC .................................................... 297/216.11

(58) Field of Classification Search
USPC ........................................ 297/216.11, 250.1
See application file for complete search history.

(56) References Cited

U.S. PATENT DOCUMENTS 7,293,828 B2 * 11/2007 Yoshida .................... 297/216.11
2010/0194158 A1 * 8/2010 Mahal et al. ............. 297/216.11

* cited by examiner

*Primary Examiner* — Milton Nelson, Jr.
(74) *Attorney, Agent, or Firm* — Alston & Bird LLP

(57) ABSTRACT

The object of the invention to improve significantly the safety of a child sitting in a safety seat in a vehicle in case of a side impact will be solved by a child safety seat for a vehicle according to the invention comprising an outer shell with a seating area for a child and side wings located on both sides of the seating area, whereas at least one side wing comprises at least one side-impact-pusher-element.

9 Claims, 3 Drawing Sheets

CHILD SAFETY SEAT FOR VEHICLE

CROSS-REFERENCE TO RELATED APPLICATIONS

This application claims priority to European Patent Application No. 11007467.1-2424, filed Sep. 13, 2012, which is hereby incorporated herein in its entirety by reference.

FIELD

The invention relates to a child safety seat for a vehicle which allows to improve the side-impact-protection of a passenger in a safety seat.

BACKGROUND

In the art, numerous child safety seats are known which are firmly fixed to the vehicle, e.g. by means of ISOFIX. It is also known in the art that child safety seats comprise side wings which protect the child in the safety seat in case of a side impact since the side wings will absorb energy of an intruding door or vehicle before energy will reach the passenger.

It has been a need to constantly improve the safety of a child sitting in a child safety seat in case of a side impact. Technical solutions to improve the safety include a plurality of technical devices such as airbags, foam bags or similar devices.

Due to the dimensional restrictions, in particular to stay within certain width for ISOFIX chairs, however, limitations may apply with regard to the thickness of the side wings.

BRIEF SUMMARY

An object of the invention is to improve significantly the safety of a child sitting in a safety seat in a vehicle in case of a side impact.

This problem will be solved by a child safety seat for a vehicle according to the invention comprising an outer shell with a seating area for a child and side wings located on both sides of the seating area, characterized that at least one side wing comprises at least one side-impact-pusher-element.

Advantageously, the child safety seat further comprises at least one side-impact-pusher-element with an energy absorbing area to be bent off, deformed from or separated from said side-impact-pusher-element or destroyed upon a side impact on the vehicle.

Advantageously, said energy absorbing area of that side-impact-pusher-element is ring-shaped adjacent to a groove which separates said energy absorbing area from a pusher area, whereas said side-impact-pusher is made of substantially rigid synthetic material and the at least one side-impact-pusher-element is located in a cut-out of the at least one side wing.

Advantageously, the cut-out has substantially the same shape as the pusher area of said side-impact-pusher-element and the cut-out is designed to let said pusher area of the side-impact-pusher-element pass through towards the seat area upon a side impact on the vehicle.

In another preferred embodiment of the present invention the cut-out comprises means that are extending across the cut-out and are designed to break or deform when the pusher of the side-impact-pusher-element passes through towards the seat area upon a side impact on the vehicle.

Advantageously, the means is made of a mesh which extends over the cut-out and the mesh will be disintegrated from the seat area upon a side impact on the vehicle.

Advantageously, the child safety seat according to the invention may comprise several side-impact-pusher-elements whereas the location of the side-impact-pusher-elements is chosen so that the child may benefit from the side-impact-pusher-elements and is firmly held in the seat in case of a side impact on the vehicle. Preferably the side-impact-pusher-elements are located between a side panel and the shell of the safety seat.

The inventive side-impact-pusher-elements meet the technical demands for holding a child in a child safety seat while at the same time the outer dimensions of the child safety seat will not be extending beyond the limits according to the legal requirements, e.g. ISOFIX limits.

Another advantage of the side-impact-pusher-elements is that the side wings will function as the first contact of the child safety seat and an intruding door in case of a side impact. The impact will result in a compression of the side wings and the side panels. This energy will be utilized to push the side-impact-pusher-elements towards the child seating in the safety seat. The incoming force will compress the side panels of the safety seat which will absorb a first amount of energy. Upon a side impact, in conventional state of the art safety seats the person sitting in the seat will be subject to an acceleration which will rapidly be stopped when reaching the other end of the safety seat. The sudden acceleration and sudden deceleration with collision of structural elements of the child safety seat may cause damage.

With the child safety seat according to the invention implementing the side-impact-pusher-elements the energy of the side impact will be used to transport the side-impact-pusher-elements from the outside area of the child safety seat into it seating area, preferably the side panels into the inner area of the child safety seats and by that reducing the possible area in which the child may be accelerated and decelerated.

The achieved space reduction may be in the range of 5 to 50% preferably between 10 and 35%. According to the invention, the location of the side-impact-pusher-system as well as the number of implemented side-impact-pusher-elements in a child safety seat will be determined upon the size of the child safety seat, the age group to which the child safety seat designated and where the side-impact-pusher-elements will be located to achieve the described technical effect.

In order to optimize the technical effect of the side-impact-pusher-system, the shape, size and location of the side-impact-pusher-element is of paramount importance. Since it is advantageous to reduce the space of the child safety seat occupied by the child at least one side-impact-pusher-element may be located in the side panels in the height of the pelvis and legs of the passenger. Another side-impact-pusher-element may be located on the height of the shoulder of the passenger.

Another location may be the head area even if the head of the passenger is already protected by a partly surrounding headrest. The shape of the side-impact-pusher-element can vary and may comprise shapes of almost rectangular, oval, round, almost oval with round ages, kidney shaped or other shapes that prove to be advantageous to fulfill the object of the present invention.

Besides the technical effect to reduce the seating space within the child safety seat, the movement of the side-impact-pusher-element activated on a side impact on the vehicle is also designed to absorb energy. Various possibilities are available to reduce and absorb energy when moving a side-impact-pusher-element according to the invention.

In a preferred embodiment the pusher element comprises legs that will be bent, deformed, disintegrated or broken off in order to be first pushed from a cut-out in the shell of the child safety seat and also to be driven into the sitting area of the child safety seat.

According to other embodiments of the inventions, energy absorption during the position change of the side-impact-pusher-element can be achieved through friction, elastic material that will be compressed such as springs or other suitable ways.

The energy absorption will take place in the energy absorbing element and the rest of the energy will be directed along the occupant strong load paths, e.g. the pelvic and shoulder area to avoid injury to more fragile body areas such as chest and abdomen.

The use of the child safety seat according to the invention will result in an inventive process for improving the safety of a passenger seated in a safety seat in a vehicle in case of a side impact of said vehicle, comprising the steps:

fixing said safety seat in said vehicle;
upon side impact:
incoming door of said vehicle is making contact with outer surface of said side-impact-pusher;
Energy absorbing area of said side-impact-pusher is absorbing energy while said side-impact-pusher is being pressed through a cut out of the side wing of said safety seat;
said side-impact-pusher is making contact to said passenger to stop movement of said passenger;

FIGURES

In the following, a preferred embodiment of the present invention will be explained in more detail by means of drawings:

FIGS. 1A, 1B, and 1C show the invention concept of the side-impact-pusher system in three stages;

DETAILED DESCRIPTION

Figure 1A:
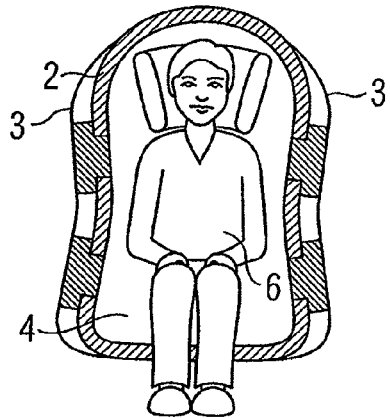
Figure 1B:
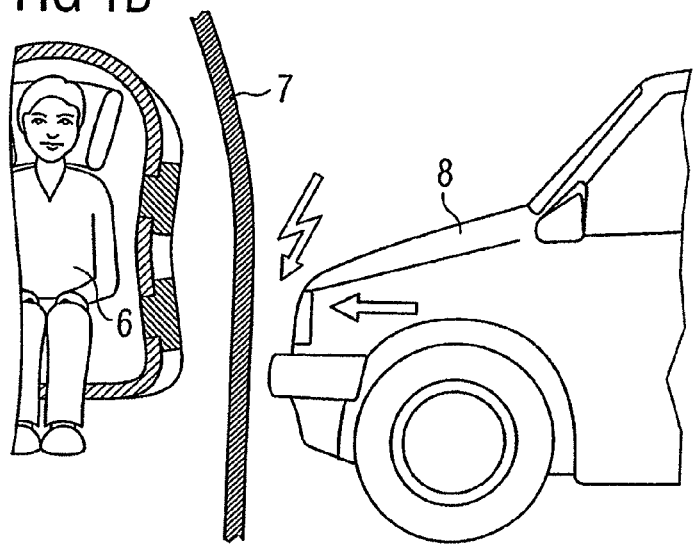
Figure 1C:
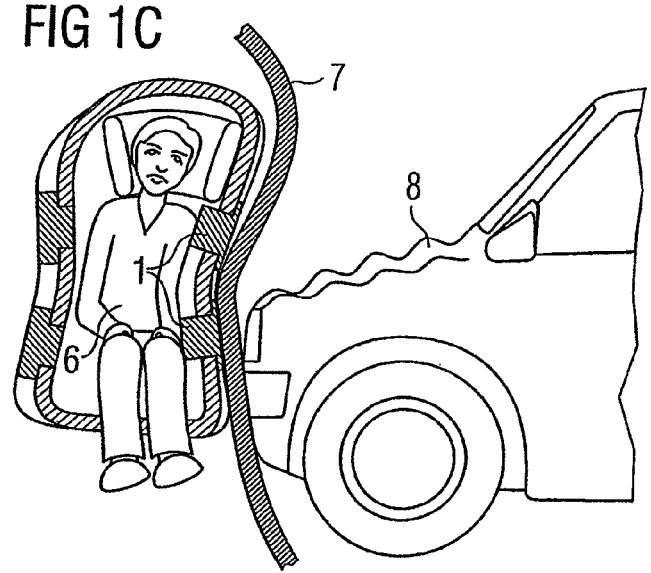

FIGS. 1A, 1B, and 1C show three stages depicting the child safety seat according to the invention per se in FIG. 1A, the child safety seat according to the invention prior to an impact in FIG. 1B, and the child safety seat according to the invention in the moment right after an impact in FIG. 1C.

In FIG. 1A the child safety seat according to the invention is shown schematically having a shell 2, panels 3 attached to the shell 2 in which the side-impact-pusher-elements 1 are located. The child safety seat comprises a seat area 4 in which a passenger, presumably a child 6 is seated.

According to FIG. 1B the location of a door of a vehicle 7 is shown which is adjacent to the child safety seat. The vehicle 8 is about to have a side impact on the vehicle 7.

In the event of a side impact by vehicle 8 on vehicle 7, the door or door element is being deformed and making contact with the side-impact-pusher-elements 1 of the child safety seat.

Figure 2A:
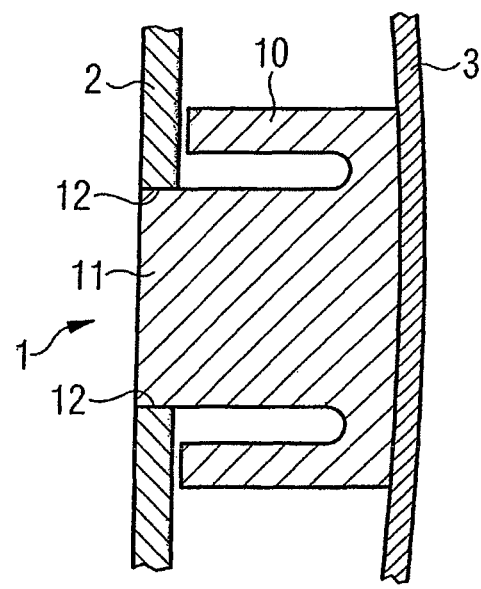
FIGS. 2A and 2B show one embodiment of a side-impact pusher in a standby position and an activated position.
Figure 2B:
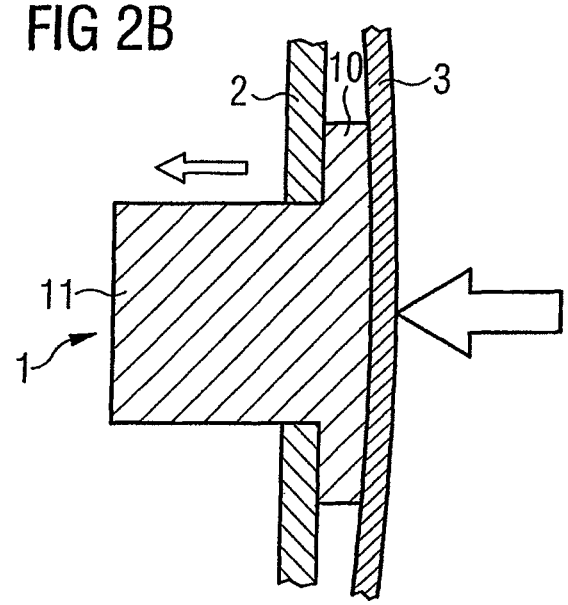

FIGS. 2A and 2B show in more detail the transformation from a standby stage shown in FIG. 2A and to the activated stage shown in FIG. 2B.

The side-impact-pusher-element 1 according to the preferred embodiment of the present invention is depicted in a cross sectional view showing a pusher area 11 and an energy absorbing area 10 as part of the side-impact-pusher-element 1 which is located between shell 2 and panel 3. In the event of an impact shown by means of an arrow on the right hand side of FIG. 2B, the panel 3 will be pushed towards the shell 2 and by that the energy absorbing area 10 will absorb energy by either breaking off or being deformed.

The pusher area 11 will intrude into the sitting area to push the passenger 6 to reduce the distance of the child 6 to the side wings.

Figure 3A:
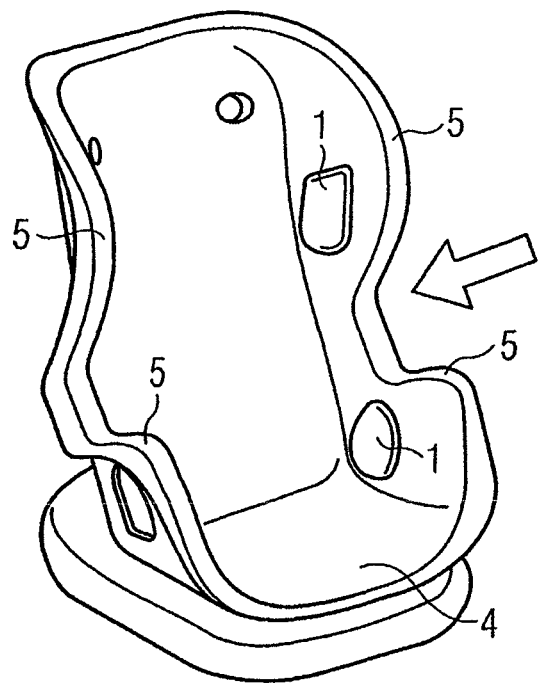
FIGS. 3A and 3B show a schematic perspective view of a child safety seat in a standby position and an activated position.
Figure 3B:
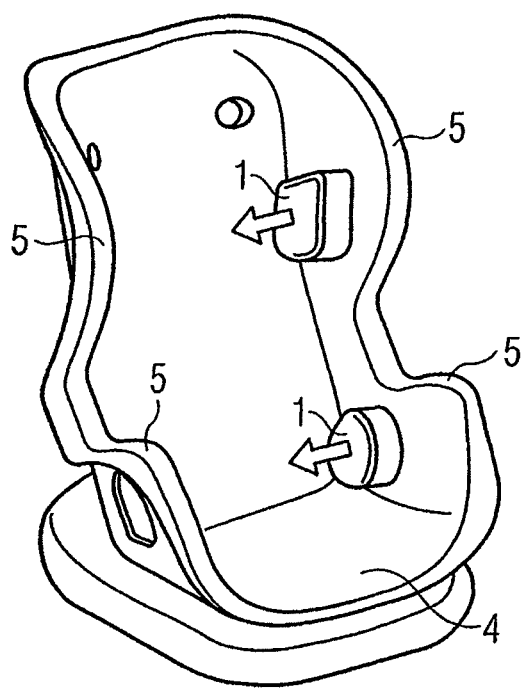

FIGS. 3A and 3B give a constructional view of the child safety seat in two stages, whereas FIG. 3A shows the standby stage with side-impact-pusher-elements 1 in the side wings 5 which is shown next to the seat area 4. In FIG. 3B the pusher elements 1 are activated and pushed inside towards to seat area 4.

What is claimed is:

1. A child safety seat for a vehicle comprising an outer shell with a seating area for a child and side wings located on both sides of the seating area, wherein at least one side wing comprises at least one side-impact-pusher element located in a cut-out of the at least one side wing, and wherein said cut-out is designed to let a pusher area of said side-impact-pusher element pass through towards said seating area upon a side impact on the vehicle.

2. The child safety seat of claim 1, wherein said cut-out has substantially the same shape as the pusher area of said side-impact-pusher element.

3. The child safety seat of claim 1, wherein said cut-out comprises means that are extending across said cut-out and are designed to break off or deform when said pusher area of said side-impact-pusher element passes through towards said seating area upon a side impact of the vehicle.

4. The child safety seat of claim 1, wherein said side-impact-pusher element is made of substantially rigid synthetic material.

5. The child safety seat of claim 1, wherein said side wings comprise a plurality of side-impact-pusher elements.

6. The child safety seat of claim 1, wherein the at least one side-impact-pusher element is provided with an energy absorbing area to be bent off, deformed from or separated from said side-impact-pusher element or destroyed upon a side impact on the vehicle.

7. The child safety seat of claim 6, wherein said energy absorbing area of said side-impact-pusher element is ring-shaped adjacent to a groove which separates said energy absorbing area from the pusher area.

8. The child safety seat of claim 1, wherein said side-impact-pusher element is located between a side panel and said shell of said child safety seat.

9. The child safety seat of claim 8, wherein the side-impact-pusher element is fixed in said cut-out.

* * * * *